United States Patent [19]

Kotaki

[11] Patent Number: 5,337,152
[45] Date of Patent: Aug. 9, 1994

[54] SOLID-STATE COLOR IMAGING APPARATUS

[75] Inventor: Hiroaki Kotaki, Yokohama, Japan

[73] Assignee: Kabushiki Kaisha Toshiba, Kawasaki, Japan

[21] Appl. No.: 33,356

[22] Filed: Mar. 18, 1993

[30] Foreign Application Priority Data

Mar. 18, 1992 [JP] Japan ................... 4-062123

[51] Int. Cl.$^5$ .................. H04N 9/04; H04N 9/07; H04N 9/097
[52] U.S. Cl. .................. 348/234; 348/235; 348/238; 348/223
[58] Field of Search .......... 358/50, 41, 43, 44, 358/29 C, 47, 48; H04N 9/04, 9/64, 9/09, 9/97

[56] References Cited

U.S. PATENT DOCUMENTS

| | | | |
|---|---|---|---|
| 4,249,203 | 2/1981 | Yamanaka | 358/50 |
| 4,638,350 | 1/1987 | Kato et al. | 358/29 C |
| 4,768,085 | 8/1988 | Hashimoto | 358/44 |
| 4,879,591 | 11/1989 | Takei | 358/44 |
| 4,931,856 | 6/1990 | Hieda et al. | 358/44 |

OTHER PUBLICATIONS

Japanese Patent Disclosure (KOKAI) 63-164589 (KOTAKI) Jul. 7, 1988.

Primary Examiner—James J. Groody
Assistant Examiner—Michael H. Lee
Attorney, Agent, or Firm—Cushman, Darby & Cushman

[57] ABSTRACT

A first solid-state imaging element and second and third solid-state imaging elements are arranged spatially so as to be horizontally shifted half a pixel pitch from one another so that a light-sensitive portion of each pixel of the second and third solid-state imaging elements may correspond to a light-insensitive portion of each pixel of the first solid-state imaging element. A high-frequency component synthesizer circuit produces the high-frequency components of a luminance signal on the basis of the signal $E_G$ obtained by performing nonlinear process on the output of the first solid-state imaging element and the signal $E_R + E_B$ obtained by performing nonlinear process on the outputs of the second and third solid-state imaging elements and mixing the resulting signals. At this time, based on the result of comparing the output signal of the first solid-state imaging element with the respective output signals of the second and third solid-state imaging elements, the mixing ratio of signal $E_R$ to $E_B$ is controlled.

11 Claims, 5 Drawing Sheets

SOLID-STATE COLOR IMAGING APPARATUS

BACKGROUND OF THE INVENTION

1. Field of the Invention

This invention relates to a multi-plate solid-state color imaging apparatus with separate solid-state imaging elements for the individual color components, and more particularly to improvements in a multi-plate solid-state color imaging apparatus using what is called a spatial pixel-shifting method, in which the solid-state imaging elements are shifted from each other horizontally so that a light-insensitive portion of each pixel of the solid-state imaging element located in a reference position may align with a light-sensitive portion of each pixel of the other solid-state imaging elements.

2. Description of the Related Art

Figure 1:
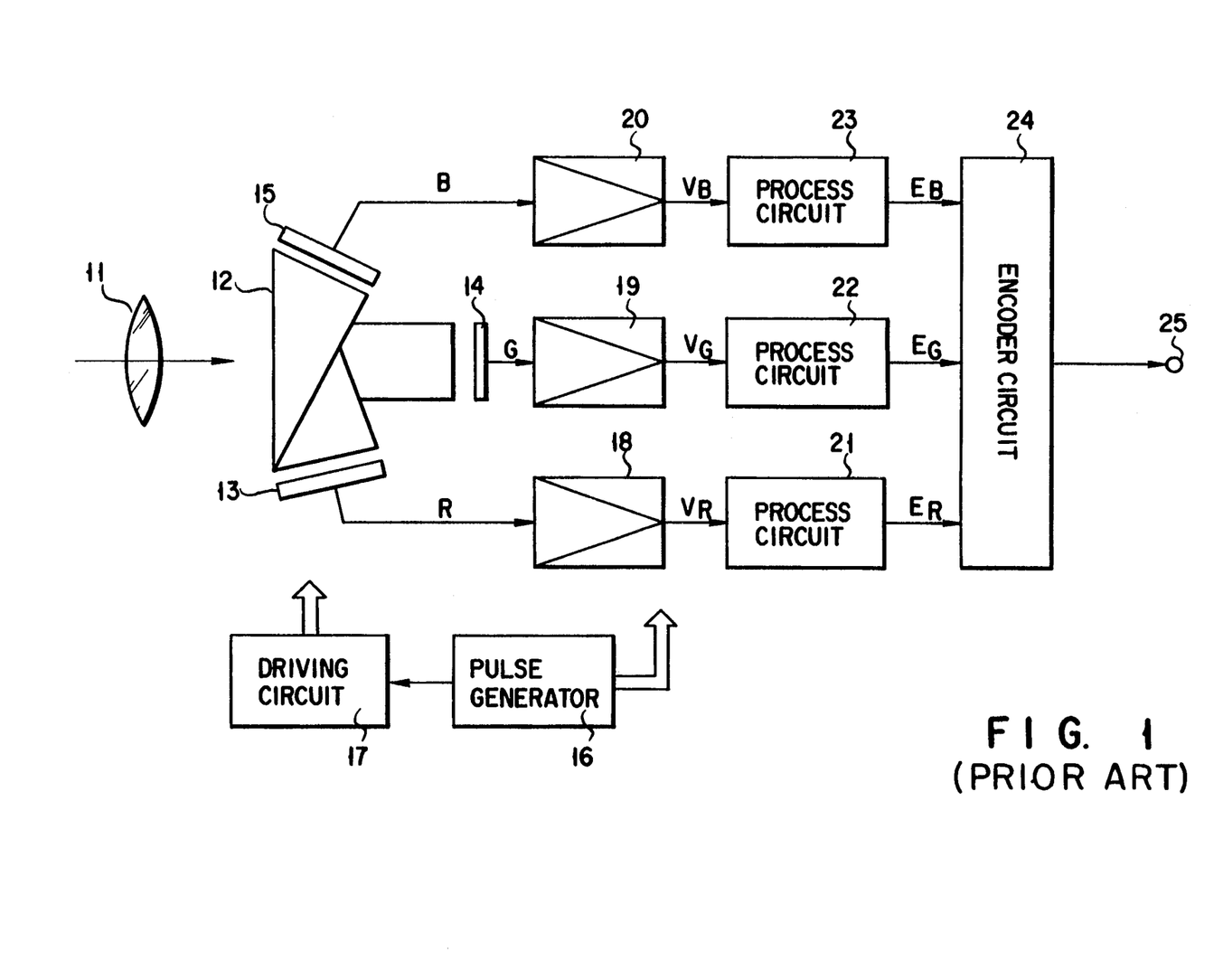
FIG. 1 is a block diagram showing a general construction of a three-plate solid-state color imaging apparatus.

For known multi-plate solid-state color imaging apparatuses, three-plate solid-state color imaging apparatuses using three solid-state imaging elements have recently been popularized. FIG. 1 shows a general construction of such a three-plate solid-state color imaging apparatus. In FIG. 1, numeral 11 indicates a camera lens. The optical image of a subject passing through the camera lens 11 is resolved by a color separation prism 12 into three color components, an R (red) component, a G (green) component, and a B (blue) component, which are then focused on three solid-state imaging elements 13, 14, and 15 provided for the respective color components, and are converted into electric signals.

The photoelectric conversion of the three solid-state imaging elements 13, 14, and 15 is controlled by the driving pulses generated by a driving circuit 17 based on the pulse signal supplied from a pulse generator circuit 16.

The signals supplied from the solid-state imaging elements 13, 14, and 15 are amplified to a specified level by amplifier circuits 18, 19, and 20, respectively, and then undergo white balance adjustment. The resulting signals are supplied to process circuits 21, 22, and 23, respectively, and then undergo nonlinear processing including gamma correction.

The respective output signals $E_R$, $E_G$, and $E_B$ of the process circuits 21, 22, and 23 are supplied to an encoder circuit 24, which encodes these signals into a television signal of, for example, the NTSC system, one of standard television systems. This produces a television signal corresponding to the optical image of the subject. The television signal thus produced is taken out from the output terminal 25 and used, for example, to display the image on a television set or record the image on a recording medium such as a magnetic tape.

Solid-state imaging elements have a poorer resolution than conventional high-performance camera tubes. Thus, for the above-described three-plate solid-state color imaging apparatus, the horizontal spatial arrangement of the three solid-state imaging elements 13, 14, and 15 is improved for better horizontal resolution.

The improvement is such that, for example, the mounting position of the G-component solid-state imaging element 14 is used as a reference, and the G-component solid-state imaging element 14, and the remaining R-component and B-component solid-state imaging elements 13 and 15 are placed in such a manner that they are shifted half a pixel pitch from each other horizontally so that a light-insensitive portion of each pixel of the solid-state imaging element 14 in the reference position may align with a light-sensitive portion of each pixel of the other R-component and B-component solid-state imaging elements 13 and 15. This is what is called a spatial pixel-shifting method.

With the spatial pixel-shifting method, if the phase of the electric signal from, for example, the solid-state imaging element 14 is used as the reference phase or zero phase, and the phase of the electric signals from the solid-state imaging elements 13 and 15 is set as $\pi$ phase 180° shifted from the zero phase, when the encoder circuit 24 produces a luminance signal from the respective output signals $E_R$, $E_G$, and $E_B$ of the process circuits 21, 22, and 23, synthesizing the outputs $E_R$, $E_G$, and $E_B$ at a mixing ratio of $0.30\ E_R + 0.59\ E_G + 0.11\ E_B$ seems to roughly double the number of pixels in the horizontal direction, providing a higher resolution.

Specifically, in a case where an achromatic subject is shot under standard illumination, when the white balance is suitably adjusted, the level ratio of the respective output signals $V_R$, $V_G$, and $V_B$ of the amplifier circuits 18, 19, and 20 will be:

$$V_R : V_G : V_B = 1:1:1 \tag{1}$$

As a result of this, the level ratio of the respective output signals $E_R$, $E_G$, and $E_B$ of the process circuits 21, 22, and 23 will be:

$$E_R : E_G : E_B = 1:1:1 \tag{2}$$

Since the luminance signal synthesized at the encoder circuit 24 is made up of zero-phase signal $E_G$ and two $\pi$-phase signals $E_R$ and $E_B$ in a ratio of $0.59 : 0.41$, it is impossible to precisely equalize the signal amount ratio of zero-phase signal $E_G$ to $\pi$-phase signal $E_R + E_B$ with 1:1 because of restrictions on the luminance signal of the NTSC system, but a higher resolution can be achieved.

Since a change in the color temperature conditions with the white balance suitably adjusted collapses the relationship expressed by equations (1) and (2), this reduces the high resolution effect. In this case, if the white balance is readjusted under new color temperature conditions, it is possible to return the signal amount ratio of zero-phase signal $E_G$ to $\pi$-phase signal $E_R + E_B$ to the original ratio 0.59:0.41.

Under illumination of high color temperatures, the output level of the R-component solid-state imaging element 13 is low because there are few red components from the beginning. Therefore, to adjust the white balance, it is necessary to amplify the output signal of the solid-state imaging element 13 to as high a level as meets equation (1).

However, greatly amplifying the output signal of solid-state imaging element 13 means that the signal-to-noise (SN) ratio of the output signal of solid-state imaging element 13 is degraded, and consequently the SN ratio of the luminance signal is deteriorated.

Even if the white balance is suitably adjusted under the standard illumination, the signal amount ratio of zero-phase signal $E_G$ and $\pi$-phase signals $E_R + E_B$ constituting the luminance signal approaches 0.59:0.11 because, for example, a cyanic subject has almost no red component from the beginning. As a result, zero-phase signals $E_G$ and $\pi$-phase signal $E_R + E_B$ become unbalanced in signal level, which weakens the offset effect of moire components produced by solid-state imaging elements 14, and 13 and 15 half a pixel pitch horizontally shifted from each other, leading to the disadvantage that the high resolution effect decreases rapidly.

As described above, the conventional three-plate solid-state color imaging apparatus encounters the problem that, when the color temperature conditions for the subject change during shooting, zero-phase signal $E_G$ and $\pi$-phase signals $E_R + E_B$ become unbalanced in signal level, resulting in a decrease in the high resolution effect.

At this time, readjusting the white balance under new color temperature conditions allows the signal amount ratio of zero-phase signal $E_G$ and $\pi$-phase signal $E_R + E_B$ to return to the original ratio. However, it is necessary to amplify the R-component signal greatly because, for example, the output level of the R-component solid-state imaging element 13 is low from the beginning under illumination of high color temperatures. This degrades the SN ratio of the R component signal, and consequently the SN ratio of the luminance signal.

Further, even if the white balance has been suitably adjusted under the standard illumination, the signal amount ratio of zero-phase signal $E_G$ to $\pi$-phase signal $E_R + E_B$ constituting the luminance signal has approached 0.59:0.11 because, for example, a cyanic subject has almost no red component from the beginning. As a result, zero-phase signal $E_G$ and $\pi$-phase signal $E_R + E_B$ has become unbalanced in signal level, which has reduced the high resolution effect.

SUMMARY OF THE INVENTION

Accordingly, the object of the present invention is to provide a solid-state color imaging apparatus capable of preventing a decrease in the high resolution effect of the luminance signal and deterioration of the luminance signal's SN ratio even if the color temperature conditions for a subject have changed.

According to one aspect of the present invention, there is provided a solid-state color imaging apparatus containing a color separation section for resolving an optical image of a subject shot into a first through a third different color component, and a first through a third solid-state imaging element provided for the first through third color components, respectively, resolved by the color separation section, on which the three kinds of optical images of the first through third color components are formed respectively, wherein at least either the first solid-state imaging element or the second and third solid-state imaging elements are shifted spatially from each other so that a light-sensitive portion of each pixel of the second and third solid-state imaging elements may correspond to a light-insensitive portion of each pixel of the first solid-state imaging element, the solid-state color imaging apparatus comprising: a high-frequency luminance-signal generator section for producing the high-frequency components of a luminance signal on the basis of the mixed signal obtained by mixing the output signals of the second and third solid-state imaging elements and the output signal of the first solid-state imaging element; a wideband color signal generator section for producing three kinds of wideband color signals corresponding to the first through third color components by combining the high-frequency components of the luminance signal from the high-frequency luminance-signal generator section, and the low-frequency components of the respective output signals for the first through third solid-state imaging elements; a luminance-signal generator circuit for producing a luminance signal by combining the three kinds of wideband color signals from the wideband color signal generator section in a specified mixing ratio; and a control section for controlling the mixing ratio in mixing the respective output signals of the second and third solid-state imaging elements in the high-frequency luminance-signal generator section.

DETAILED DESCRIPTION OF THE PREFERRED EMBODIMENTS

Figure 2:
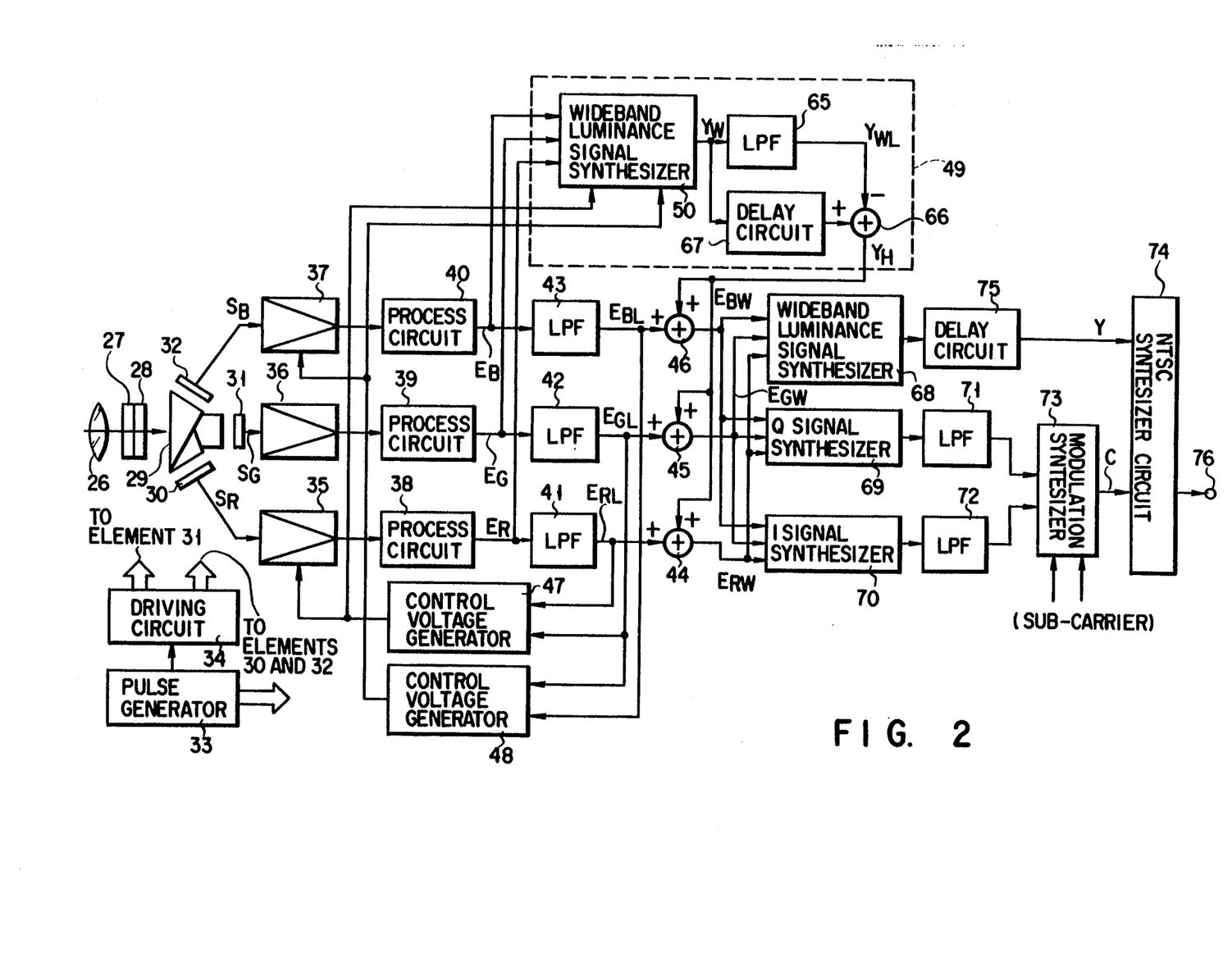
FIG. 2 is a block diagram of a solid-state imaging color apparatus according to an embodiment of the present invention.

An embodiment of the present invention will be explained in detail, referring to the accompanying drawings. In FIG. 2, numeral 26 indicates a camera lens. The optical image of a subject passing through the camera lens 26 is projected onto a color separation optical system 29 via a spectral characteristic adjusting filter 27 and an optical LPF (low-pass filter) 28.

The color separation optical system 29 breaks down the incident light into the three primary colors, R-component, G component, and B component. Each primary-color component is focused on the light-sensitive surface of three solid-state imaging elements 30, 31, and 32 provided for the respective primary-color components, to produce a corresponding primary-color image. Each of the solid-state imaging elements 30, 31, and 32 has 500 pixels per column x 800 pixels per row, for example.

The positional relationship between the solid-state imaging elements 30, 31, and 32 is such that the G-component solid-state imaging element 31 and the R-component and B-component solid-state imaging elements 30 and 32 are arranged so that they may be shifted half a pixel pitch from each other horizontally. Specifically, they are arranged so that a light-sensitive area of each pixel of R-component and B-component solid-state imaging elements 30 and 32 correspond to a light-insensitive area of each pixel of G-component solid-state imaging element 31, whereas a light-sensitive area of each pixel of G-component solid-state imaging element 31 may correspond to a light-insensitive area of each pixel of R-component and B-component solid-state imaging elements 30 and 32.

The photoelectric conversion of the solid-state imaging elements 30, 31, and 32 is controlled by the vertical transfer pulses and the horizontal transfer pulses generated by a driving circuit 34 based on the pulse signal supplied from a pulse generator circuit 33. The horizontal transfer pulse supplied to G-component solid-state imaging element 31 can be as much as half a pixel (approximately 35 ns) out of phase with the horizontal transfer pulse supplied to R-component and B-component solid-state imaging elements 30 and 32 so as to correspond to the positional shift between the solid-state imaging element 31 and the solid-state imaging elements 30 and 32.

The output signals $S_R$, $S_G$, and $S_B$ of the solid-state imaging elements 30, 31, and 32 are amplified by amplifier circuits 35, 36, and 37 to a specified level, respectively, and then are directed to process circuits 38, 39, and 40, which perform nonlinear processes, such as gamma correction, on the respective inputs. The output signals $E_R$, $E_G$, and $E_B$ of the process circuits 38, 39, and 40 are supplied to LPFs 41, 42, and 43 whose cut-off frequency is 7 MHz each, which cut off the components higher than the Nyquist limit (approximately 7.2 MHz). After this, the resulting signals are supplied to one input terminal of adder circuits 44, 45, and 46, respectively.

The output signals $E_{RL}$ and $E_{GL}$ of the LPFs 41 and 42 are supplied to a control voltage generator circuit 47, and the output signals $E_{GL}$ and $E_{BL}$ of the LPFs 42 and 43 are supplied to a control voltage generator circuit 48. The control voltage generator circuits 47 and 48 produce a control voltage for controlling the amplification degree of the amplifier circuits 35 and 37 based on the input signals $E_{RL}$, $E_{GL}$ and $E_{GL}$, $E_{BL}$. In this case, the amplification degree is controlled so that the level of the output signals $E_{RL}$, $E_{GL}$, and $E_{BL}$ of the LPFs 41, 42, and 43 when an achromatic subject is shot may be equalized for white balance adjustment.

Figure 3:
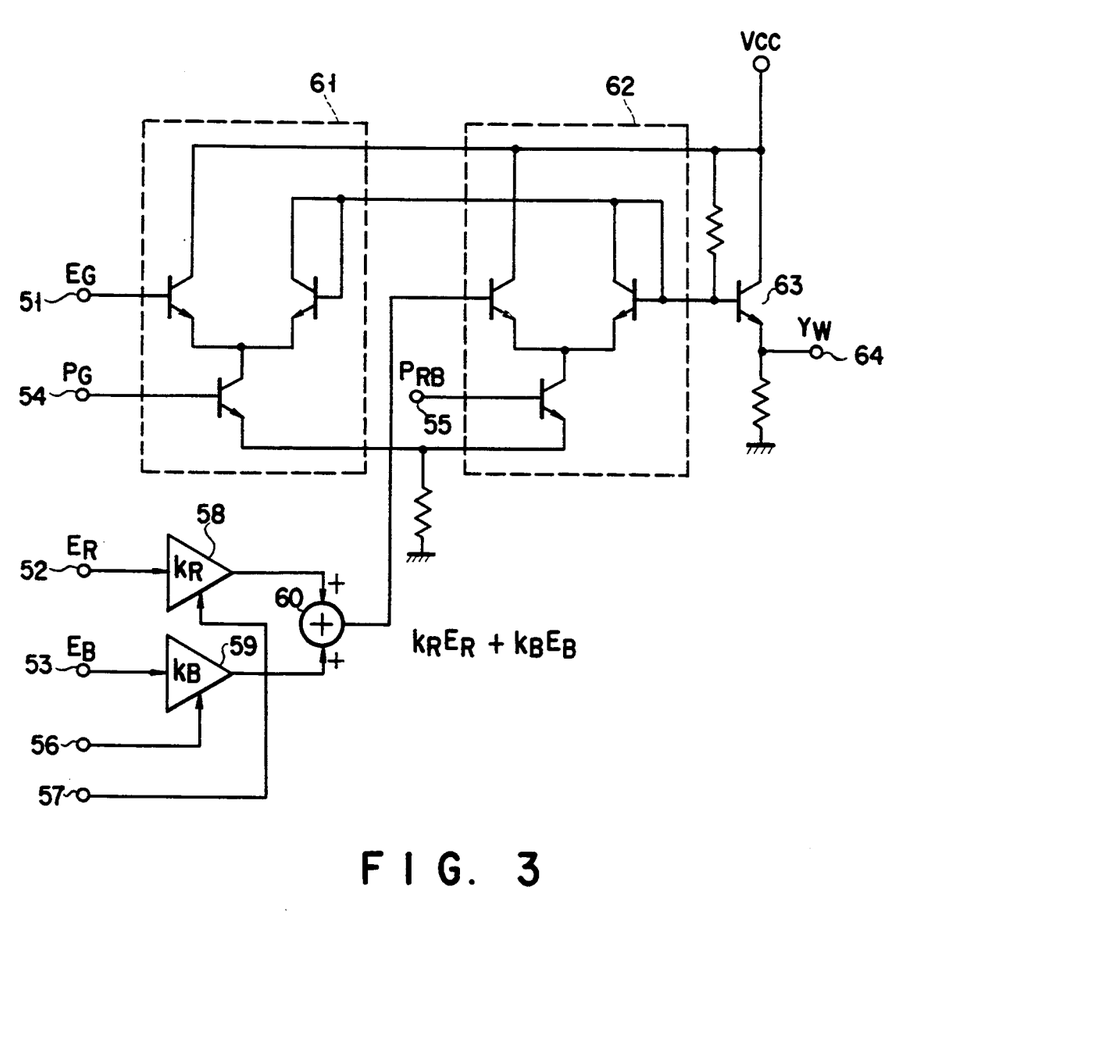
FIG. 3 is a detailed circuit diagram of the wideband luminance-signal synthesizer circuit of the embodiment.

On the other hand, the output signals $E_R$, $E_G$, and $E_B$ of the process circuits 38, 39, and 40 are supplied to a wide band luminance-signal synthesizer circuit 50 in a luminance-signal high-frequency component synthesizer circuit 49, which synthesizes a wideband luminance signal $Y_W$. As shown in FIG. 3, the wideband luminance-signal synthesizer circuit 50 has input terminals 51, 52, and 53 supplied with the output signals $E_G$, $E_R$, and $E_B$ from the process circuits 39, 38, and 40, and input terminals 54 and 55 supplied with gate pulses $P_G$ and $P_{RB}$ shown in FIG. 4, and input terminals 56 and 57 supplied with the output voltages from the control voltage generator circuits 48 and 47.

Of those signals supplied, signals $E_R$ and $E_B$ are level-adjusted at amplifier circuits 58 and 59, respectively, whose gain is controlled by the output voltage of the control voltage generator circuits 47 and 48, respectively. The resulting signals are then added at an adder circuit 60 to adjust them to the same level as that of the output signal $E_G$ of the process circuit 39 obtained when the achromatic subject is shot under the illumination at that time.

Here, the gain control operation of the amplifier circuits 58 and 59 will be explained in detail. If the gains of amplifiers 58 and 59 are $k_R$ and $k_B$, respectively, what is required is to determine the gains $k_R$ and $k_B$ so that the following three equations are met when the achromatic subject is shot under the illumination at that time:

$$k_R E_R + k_B E_B = E_G \quad (3)$$

$$k_R + k_B = 1 \quad (4)$$

$$k_R : k_B = S_{RT} : S_{BT} \quad (5)$$

where $S_{RT}$ and $S_{BT}$ in equation (5) indicate the amounts proportional to the output levels of the solid-state imaging elements 30 and 32, respectively, in shooting the achromatic subject.

Figure 5:
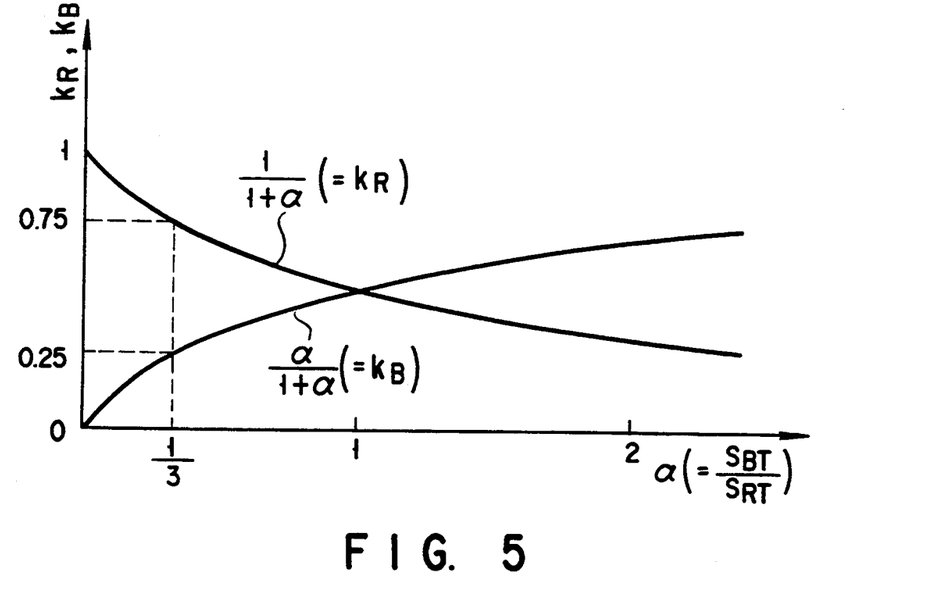
FIG. 5 is a characteristic diagram for explaining an example of the gain control means of the amplifier circuit in the wideband luminance-signal synthesizer circuit.

Solving equations (3) through (5) gives:

$$k_R = 1/(1+\alpha) \quad (6)$$

$$k_B = \alpha/(1+\alpha) \quad (7)$$

where $\alpha = S_{BT}/S_{RT}$. FIG. 5 shows a characteristic diagram with $\alpha$ on the abscissa and $k_R$ and $k_B$ on the ordinate.

For example, under a tungsten-halogen lamp light source often used to adjust a television camera, the ratio of $S_{RT}$ to $S_{BT}$ will be roughly:

$$S_{RT} : S_{BT} = 3 : 1$$

This gives $\alpha = \frac{1}{3}$ and consequently $k_R = 0.75$ and $k_B = 0.25$ as seen from FIG. 5.

When the lighting environment has changed and consequently the color temperature of the light source has varied, the white balance is set again to change the ratio of gain $k_R$ to $k_B$. For example, the color temperature rises, the value of $S_{BT}$ becomes larger than that of SRT, so that the value of a becomes larger than $\frac{1}{3}$. For this reason, it is necessary to make gain $k_R$ relatively small and conversely gain $k_B$ relatively large.

The above-described control is desirable from the viewpoint of the SN ratio of luminance signal. Specifically, for example, when the color temperature is as high as 7000 K, the level of the output signal $S_R$ of solid-state imaging element 30 for color component R is low from the beginning, so that the control voltage generator circuit 47 operates so as to raise the gain of the amplifier circuit 35. Therefore, at this time, the SN ratio of the output signal $E_R$ of the process circuit 38 is decreased as compared with that under the tungsten-halogen lamp light source. In this state, when addition is made at the adder circuit 60 with $k_R : k_B = 3 : 1$, the SN ratio of the wideband luminance signal $Y_W$ is also degraded as seen from the construction of the wideband luminance-signal synthesizer circuit 50 shown in FIG. 3. To avoid this, the above-mentioned control is done to suppress the deterioration of the SN ratio of the wideband luminance signal $Y_W$.

It should go without saying that, when the control voltage generator circuits 47 and 48 operate so as to raise the gain of the amplifier circuits 35 and 37, the gain of the amplifier circuits 58 and 59 is decreased; and conversely when the control voltage generator circuits 47 and 48 operate so as to decrease the gain of the amplifier circuits 35 and 37, the gain of the amplifier circuits 58 and 59 is raised.

Figure 4:
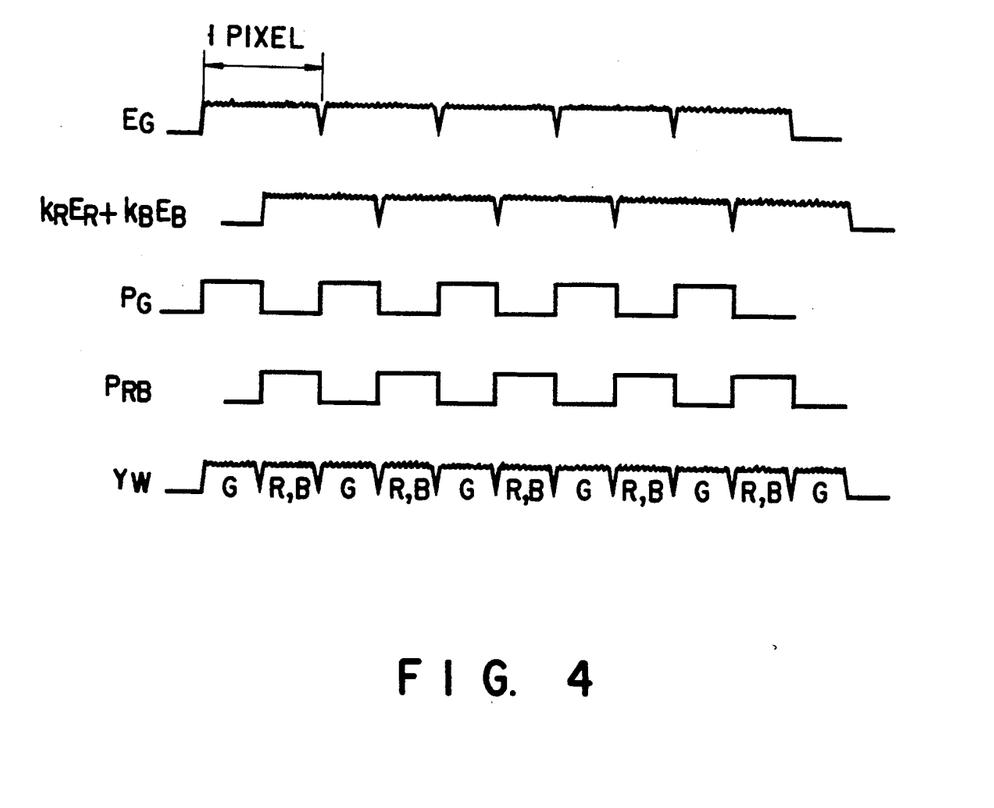
FIG. 4 is a timing chart for explaining the operation of the wideband luminance-signal synthesizer circuit.

In the wideband luminance-signal synthesizer circuit 50 of FIG. 3, a gate circuit 61 for signal $E_G$ and a gate circuit 62 for signal $(k_R E_R + k_B E_B)$ are connected in parallel, and the outputs of the gate circuits 61 and 2 are directed to the output terminal 64 via a transistor 63. Because there is a n-phase shift between signal $E_G$ and signal $(k_R E_R + k_R E_B)$, the wideband luminance signal $Y_W$ can be obtained by gating those two signals with gate pulses $P_G$ and $P_{RB}$ with as is shown in FIG. 4, a $\pi$-phase shift between them and then interpolating the resulting signal. As a result, the Nyquist frequency of the wideband luminance signal $Y_W$ doubles to approximately 14.3 MHz.

Then, in FIG. 2, the wideband luminance signal $Y_W$ passes through an LPF 65 whose cut-off frequency is the same as that of the LPFs 41, 42, and 43, and becomes a luminance signal $Y_{WL}$ from which the high-frequency components higher than 7 MHz have been removed, which is supplied to a subtracter circuit 66. At the same time, the wideband luminance signal $Y_W$ is directed to the subtracter circuit 66 via a delay circuit 67 whose delay time is the same as that of the LPF 65.

The luminance signal $Y_{WL}$ passing through the LPF 65 is subtracted from the wideband luminance signal $Y_W$ passing through the delay circuit 67 to produce the high-frequency component $Y_H(=Y_W-Y_{WL})$ of the luminance signal. The high-frequency component $Y_H$ of the luminance signal is directed to the adder circuits 44, 45, and 46, which add it to the output signals $E_{RL}$, $E_{GL}$, and $E_{BL}$ of the LPFs 41, 42, and 43 to produce the three primary color signals of wide band $E_{RW}(=E_{RL}+Y_H)$, $E_{GW}(=E_{GL}+Y_H)$, and $E_{BW}(=E_{BL}+Y_H)$.

The three primary color signals of wideband $E_{RW}$, $E_{GW}$, and $E_{BW}$ are directed to a wideband luminance-signal synthesizer circuit 68, which mixes them in the mixing ratio in the NTSC system of 0.30:0.59:0.11 to produce a luminance signal Y. Further, the three primary color signals $E_{RW}$, $E_{GW}$, and $E_{BW}$ are directed a Q signal synthesizer circuit 69, which mixes them in a mixing ratio of 0.21:−0.28:0.31. They are also directed to an I-signal synthesizer circuit 70, which mixes them in a mixing ratio of 0.60:−0.28:−0.32 to produce a Q signal and an I signal in the NTSC system.

The Q signal undergoes band limitation at an LPF 71 whose cut-off frequency is 0.5 MHz. The I signal undergoes band limitation at an LPF 72 whose cut-off frequency is 1.5 MHz. The output signals of the LPFs 71 and 72 are subjected to orthogonal modulation at a modulation synthesizer circuit 73, and converted into a modulated color signal C, which is supplied to an NTSC synthesizer circuit 74.

The luminance signal Y from the wideband luminance signal synthesizer circuit 68 is supplied to a delay circuit 75, which mates the signal with the modulated color signal C in time phase and supplies the resulting signal to the NTSC synthesizer circuit 74. The NTSC synthesizer circuit 74 synthesizes a color image signal in the NTSC system from the luminance signal Y and the modulated color signal C. The image signal is supplied from an output terminal 76.

With the above embodiment, when the wideband luminance signal synthesizer circuit 50 performs gate interpolation of signal $E_G$ and signal $(k_RE_R+k_BE_B)$, the ratio of gain $k_R$ to $k_B$ of the amplifier circuits 58 and 59 of FIG. 3 is changed according to the information from the control voltage generator circuits 47 and 48 for adjusting the white balance. Specifically, when the control voltage generator circuits 47 and 48 operate so as to raise the gain of the amplifier circuits 35 and 37, the gains $k_R$ and $k_B$ of the amplifier circuits 58 and 59 are decreased. Conversely when the control voltage generator circuits 47 and 48 operate so as to decrease the gain of the amplifier circuits 35 and 37, the gains $k_R$ and $k_B$ of the amplifier circuits 58 and 59 are raised.

Practically, this operation is done based on the relationship shown by equations (3) through (7). By doing this, even if the lighting environment has changed and consequently the color temperature has varied, the mixing ratio of signal $E_R$ to $E_B$ is changed in synthesizing the wideband luminance signal $Y_W$ to decrease the proportion of the signal whose SN ratio is relatively degraded. As a result, it is possible to suppress the deterioration of the SN ratio of the final luminance signal Y with the high-resolution effect unchanged.

With the above embodiment, the luminance signal is resolved into the high-frequency components associated with the resolution and the low-frequency components having an effect on color reproduction. For the low-frequency components, the mixing ratio is always made to agree with that in the NTSC system. Therefore, as different from the solid-state color imaging apparatus explained in FIG. 1, it is possible to realize a highly accurate color reproduction, while maintaining the resolution. While in the solid-state color imaging apparatus of FIG. 1, the luminance signal is obtained by simple addition in obtaining high resolution information, in the above embodiment, signal $E_G$ and signal $(k_RE_R+k_BE_B)$ undergo gate interpolation alternately as seen from FIGS. 3 and 4, which enables the moire components to be offset completely, making it possible to realize the high resolution effect up to the theoretical limit.

In the above embodiment, the information from the control voltage generator circuits 47 and 48 for adjusting the white balance is used as a means for changing the mixing ratio of signal $E_R$ to $E_B$ in performing gate interpolation of signal $E_G$ and signal $(k_RE_R+k_BE_B)$ at the wideband luminance-signal synthesizer circuit 50,. Practically, control is based on the relationship expressed by equations (3) through (7). The means for changing the mixing ratio of signal $E_R$ to $E_B$ is not limited to this. The following means may be used.

Specifically, the ratio of gain $k_R$ to $k_B$ is changed according to the color information on the subject. The screen is first divided into several blocks. For each block, the average value $S_{BA}/S_{RA}$ of the ratio $S_B/S_R$ of output signal $S_B$ to $S_R$ of the solid-state imaging elements 32 and 30 is obtained for each pixel. The average value $S_{BA}/S_{RA}$ can be calculated easily with the control voltage generator circuits 47 and 48 provided with an average computing function. The average value $S_{BA}/S_{RA}$ can be considered to represent a typical value of $S_B/S_R$, one of color information items for the subject in the block.

The control voltage generator circuits 47 and 48 compare the average value $S_{BA}/S_{RA}$ with the output signal amount ratio $\alpha(=S_{BT}/S_{RT})$ for the solid-state imaging elements 30 and 32 when an achromatic subject is shot, which is previously stored in the control voltage generator circuits 47 and 48. In this case, if the average value $S_{BA}/S_{RA}$ is smaller than $\alpha$, it is judged that the subject is reddish, and control is done so as to increase the proportion of gain $k_R$ as compared with gains $k_R$ and $k_B$ determined by equations (3) through (7). Conversely, if the average value $S_{BA}/S_{RA}$ is larger than $\alpha$, it is judged that the subject is bluish, and control is done so as to increase the proportion of gain $k_B$ as compared with gains $k_R$ and $k_B$ determined by equations (3) through (7).

Figure 6:
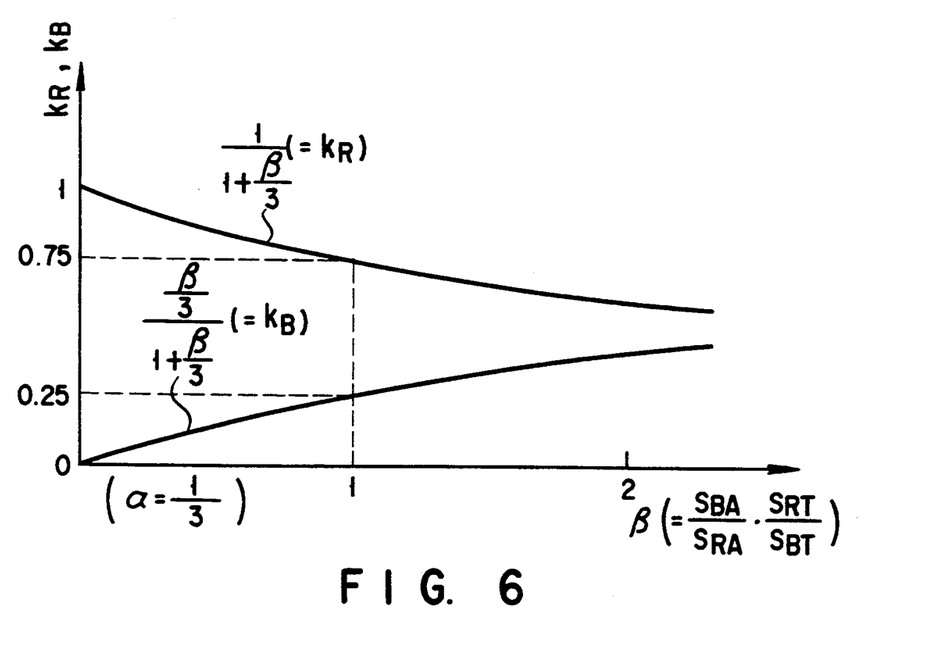
FIG. 6 is a characteristic diagram for explaining another example of the gain control means of the amplifier circuit.

Practically, such control will give:

$k_R=1/(1+\alpha\beta)$ $k_B=\alpha\beta/(1+\alpha\beta)$ where $\beta=(S_{BA}S_{RT})/(S_{RA}S_{BT})$. FIG. 6 is a characteristic diagram with D on the abscissa and $k_R$ and $k_B$ on the ordinate for $\alpha=\frac{1}{3}$, for example.

with this control system, since the ratio of gain $k_R$ to $k_B$ is changed according to the color information on the subject, the proportion of gain $k_B$ is increased relatively even in the case of, for example, a cyanic subject whose R component signal is small from the beginning. This eliminates the imbalance on the signal level ratio of zero-phase signal $E_G$ to $\pi$-phase signal $E_R+E_B$ constituting the luminance signal, making it possible to maintain the high resolution effect.

In the above embodiment, the phase of the pulses for the horizontal transfer system supplied from the driving circuit 34 is set so that the output signal $S_G$ of the G-component solid-state imaging element 31 may be shifted half a pixel from the output signals $S_R$ and $S_B$ of the solid-state imaging elements 30 and 32. The present invention is not limited to this. For instance, with the three solid-state imaging elements 30, 31, and 32 driven by pulses of the same phase, delay lines with a delay time equivalent to half a pixel pitch may be inserted in the path of the output signal $S_G$ of the G-component solid-state imaging element 31 so as to correspond to the spatial arrangement of the solid-state imaging elements 30, 31, and 32.

In the above embodiment, the G-component solid-state imaging element 31 and R-component and B-component solid-state imaging elements 30 and 32 are arranged so as to be shifted half a pixel pitch horizontally. The invention is not restricted to this. The same effect can be obtained by horizontally shifting at least one of the three solid-state imaging elements 30, 31, and 32 from the remaining two.

While in the embodiment, the output signals $E_R$, $E_G$, and $E_B$ of the process circuits 38, 39, and 40 are used as the input to the wideband luminance-signal synthesizer circuit 50, the outputs of the amplifier circuits 35, 36, and 37 may be used, for example. In this case, however, it is necessary to add another process circuit to the luminance-signal high-frequency component synthesizer circuit 49.

The present invention is not restricted to the embodiment described above. This invention may be practiced or embodied in still other ways without departing from the spirit or essential character thereof.

What is claimed is:

1. A solid-state color imaging apparatus comprising:
    color separation means for resolving an optical image of a subject shot into first, second and third different color components;
    first, second and third solid-state imaging elements provided for said first, second and third color components, respectively, where three optical images corresponding to said first, second and third color components are formed respectively, wherein at least one of either said first solid-state imaging element or said second and third solid-state imaging elements are shifted spatially from each other so that a light-sensitive portion of each pixel of said second and third solid-state imaging elements may corresponds to a light-insensitive portion of each pixel of said solid-state imaging element;
    high-frequency luminance-signal generating means for producing high-frequency components of a luminance signal on the basis of a mixed signal obtained by mixing output signals of said second and third solid-state imaging elements and an output signal of said first solid-state imaging element;
    wideband color signal generating means for producing three kinds of wideband color signals corresponding to said first through third color components by combining said high-frequency components of said luminance signal from said high-frequency luminance-signal generating means, and said low-frequency components of respective output signals for said first through third solid-state imaging elements;
    luminance-signal generating means for producing a luminance signal by combining said three kinds of wide-band color signals from the wideband color signal generating means in a specified mixing ration; and
    control means for controlling a mixing ratio of the output signal of said second and third solid-state imaging elements such that one of said output signal which has a higher level is of a greater proportion than said output signals which have a lower level when said output signals are mixed by said high-frequency luminance-signal generating means.

2. The solid-state color imaging apparatus according to claim 1, wherein said control means controls the mixing ratio of the respective output signals from said second and third solid-state imaging elements on the basis a comparison between the output signal from said first solid-state imaging element with the respective output signals from said second and third solid-state imaging elements.

3. The solid-state color imaging apparatus according to claim 2, wherein said high-frequency luminance-signal generating means contains:
    a first and a second amplifier circuit for amplifying the respective output signals from said second and third solid-state imaging elements;
    a first adder circuit for adding the output signals from the first and second amplifier circuits;
    a wideband luminance-signal generator circuit for producing a wideband luminance signal by selectively removing the output signal from the first adder circuit and the output signal from said first solid-state imaging element in a constant period corresponding to the transfer period of time per pixel;
    a first extract circuit for extracting the low-frequency components from the wideband luminance signal obtained from the wideband luminance-signal generator circuit; and
    a subtracter circuit for obtaining the high-frequency components of the luminance signal by subtracting the low-frequency components of the wideband luminance signal extracted at said first extract means from the wideband luminance signal obtained from said wideband luminance-signal generator circuit.

4. The solid-state color imaging apparatus according to claim 3, wherein said control means controls the mixing ratio of the respective output signals of said second and third solid-state imaging elements by producing a control signal for controlling the gain of said first and second amplifier circuits.

5. The solid-state color imaging apparatus according to claim 4, further comprising a fourth through a fifth amplifier circuit for amplifying the outputs of said second and third solid-state imaging elements.

6. The solid-state color imaging apparatus according to claim 5, wherein said control means uses as a control signal for controlling the gain of said first and second amplifier circuits, a control signal for adjusting the white balance by controlling the gain of said fourth and fifth amplifier circuits on the basis of the difference between the output signal from said third amplifier circuit used to amplify the output signal of said first solid-state imaging element and the respective output signals from said fourth and fifth amplifier circuits used to amplify the respective output signals of said second and third solid-state imaging elements, so that the level of the respective output signals from said third through fifth amplifier circuits may be almost equalized.

7. The solid-state color imaging apparatus according to claim 5, further comprising:
   a third through a fifth process circuit for performing a nonlinear process on the respective output signals from said third through fifth amplifier circuits; and
   a second through a fourth extract circuit for extracting the low-frequency components from the respective output signals of the first through third process circuits, and supplying the resulting signals to said wideband color signal generating means.

8. The solid-state color imaging apparatus according to claim 7, wherein said control means contains:
   a first control signal generator circuit for producing a first control signal for controlling the gain of said fourth amplifier circuit used to amplify the output signal of said second solid-state imaging element on the basis of the difference between the output signal from said second extract circuit used to process the output of said first solid-state imaging element and the output signal from said third extract circuit used to process the output of said second solid-state imaging element; and
   a second control signal generator circuit for producing a second control signal for controlling the gain of said fifth amplifier circuit used to amplify the output signal of said third solid-state imaging element on the basis of the difference between the output signal from said second extract circuit used to process the output of said first solid-state imaging element and the output signal from said fourth extract circuit used to process the output of said third solid-state imaging element, wherein said first and second control signals are used to adjust the white balance by controlling the gain of said fourth and fifth amplifier circuits so that the level of the respective output signals from said second through fourth extract circuits may be almost equalized, and control the gain of said first and second amplifier circuits, respectively.

9. The solid-state color imaging apparatus according to claim 6 or 8, wherein the gain of said first and second amplifier circuits is decreased when said control means operates so as to increase the gain of said fourth and fifth amplifier circuits, whereas the gain of said first and second amplifier circuits is increased when said control means operates so as to decrease the gain of said fourth and fifth amplifier circuits.

10. The solid-state color imaging apparatus according to claim 9, wherein said wideband color signal generating means contains a second through a fourth adder circuit for adding the high-frequency components of the luminance signal from said subtracter circuit to the respective output signals from said second through fourth extract circuits.

11. The solid-state color imaging apparatus according to claim 1, wherein said control means controls the mixing ratio of the respective output signals from said second and third solid-state imaging elements on the basis of the result of comparing the signal amount ratio of the respective output signals from said second and third solid-state imaging elements with the signal amount ratio of the respective output signals of said second and third solid-state imaging elements obtained when an achromatic subject is shot.

* * * * *